United States Patent [19]

Maspoli

[11] 4,238,647
[45] Dec. 9, 1980

[54] TELEPHONE HANDSET HAVING SHOULDER REST AND ADJUSTABLE EARPIECE

[76] Inventor: Oscar Maspoli, Via Gerso 17 A, CH-6900 Lugano, Switzerland

[21] Appl. No.: 966,301

[22] Filed: Dec. 4, 1978

[30] Foreign Application Priority Data

Dec. 7, 1977 [CH] Switzerland .................. 14970/77

[51] Int. Cl.³ ............................................ H04M 1/04
[52] U.S. Cl. ................... 179/103; 179/157; 179/182 R
[58] Field of Search .............. 179/103, 157, 182 R, 179/187

[56] References Cited

U.S. PATENT DOCUMENTS

| | | | |
|---|---|---|---|
| 1,903,565 | 4/1933 | Vartanian | 179/157 |
| 2,574,887 | 11/1951 | Pye | 179/103 X |
| 2,584,807 | 2/1952 | Miller | 179/157 |
| 3,830,987 | 8/1974 | VanDyke | 179/157 |

FOREIGN PATENT DOCUMENTS 1562206 3/1970 Fed. Rep. of Germany .......... 179/157
192454 11/1937 Switzerland .......................... 179/187

*Primary Examiner*—Thomas W. Brown
*Attorney, Agent, or Firm*—Pollock, Vande Sande and Priddy

[57] ABSTRACT

A telephone handset is provided which renders possible holding of the handset without hands during conversation and supported on the left or right shoulder of the telephone user. Depending upon whether the handset is supported on the left or right shoulder, adaptation to the outer ear is effected by rotation of the earpiece or a part of it to the left or right. The invention is based upon the combination of two components, namely a shoulder rest which can be placed transversely of the handle part of the handset and a rotatably adjustable earpiece or a part on the latter with oblique contact surface, for adaptation to the left or right human ear.

2 Claims, 10 Drawing Figures

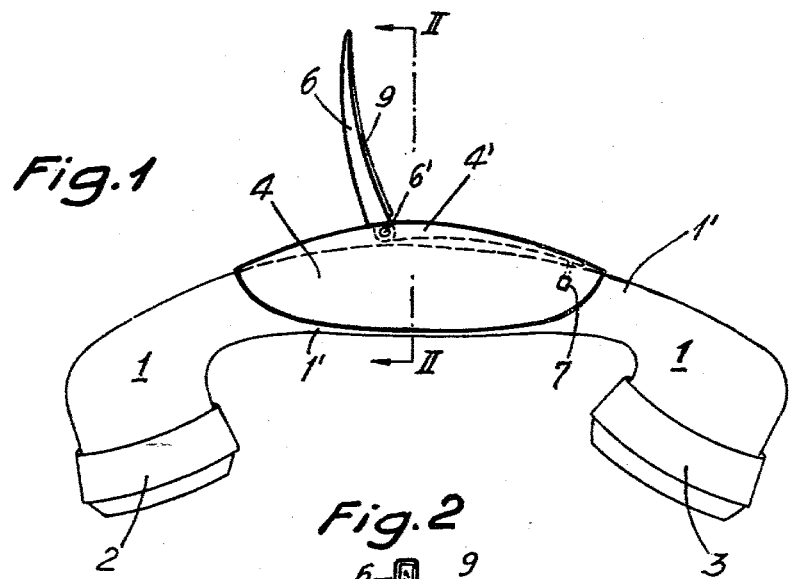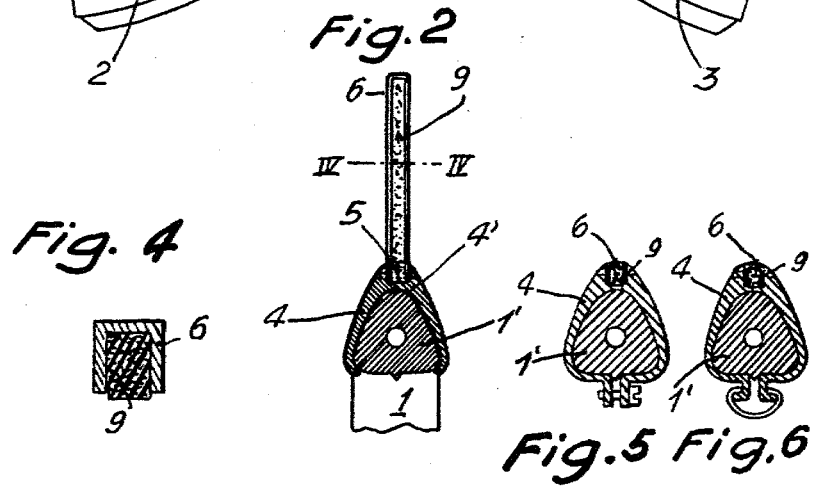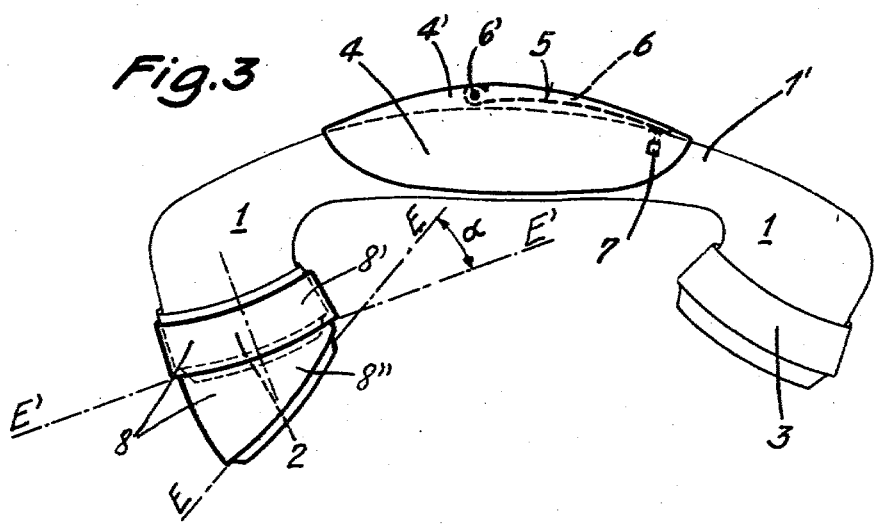

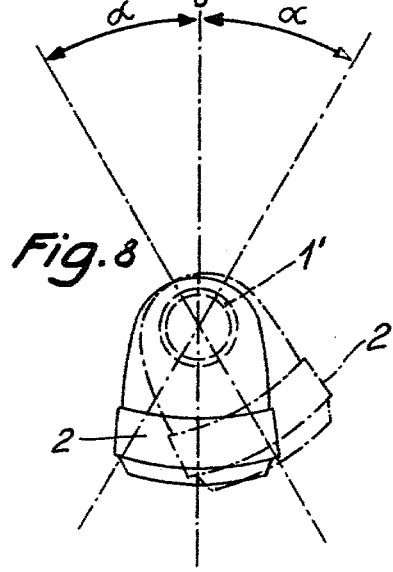
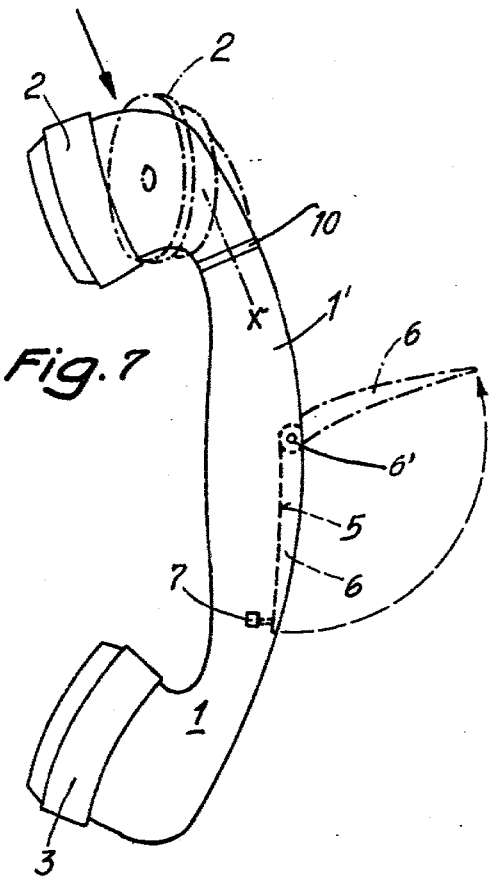
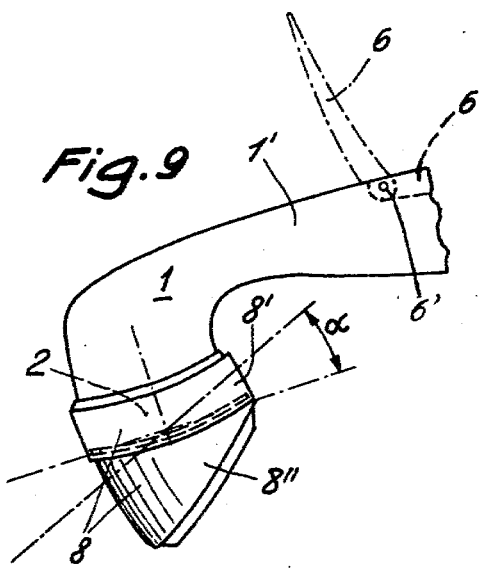
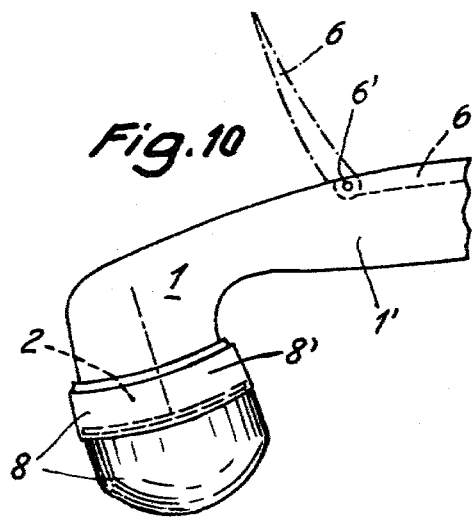

TELEPHONE HANDSET HAVING SHOULDER REST AND ADJUSTABLE EARPIECE

BACKGROUND OF THE INVENTION

Various forms of embodiment are known of telephone handset with supports which permit holding the handset adjacent the ear during conversation, without the aid of the hand. Close fit of the earpiece of the telephone handset to the ear is impossible in these cases since in each case the earpiece is placed obliquely, as a result of which not only the audibility but also secure retention suffer. When the earpiece is in an oblique position the good position for holding is lost even with slight movements of the head, arm or shoulder of the telephone user, which is not only complicated but also involves danger of dropping of the relatively heavy telephone handset.

OBJECT OF THE INVENTION

The object of the present invention is the provision of an improved telephone handset having a shoulder rest for holding the handset with hands free in conversation.

SUMMARY OF THE INVENTION

According to the inventon there is provided a handset having a handle part, an outwardly pivotable shoulder rest on the handle part of the handset or on a carrier clamped to the latter, and a rotatably adjustable earpiece or a part thereof with oblique ear-contact surface which, by displacement, permits adaptation thereof to the right or left ear of the telephone user.

BRIEF DESCRIPTION OF DRAWINGS

Three forms of embodiment of the object of the invention are illustrated by way of example in the drawing, wherein:

FIG. 1 shows a view of the handset with carrier and rest hinged outwards thereon, FIG. 2 shows a cross-section along the line II—II in FIG. 1, FIG. 3 shows a view of the handset with a hinged-in rest and an earpiece with its attachment, FIG. 4 shows a cross-section along the line IV—IV in FIG. 2, on a larger scale, FIGS. 5 and 6 show variants of FIG. 2 in a first example of embodiment, FIG. 7 shows a second form of embodiment of the handset, FIG. 8 shows a partial plan view in the direction of the arrow in FIG. 7, FIG. 9 shows a partial view of a third form of embodiment of the handset with an earpiece attachment and FIG. 10 shows the same partial view of the handset in a first normal position, in which the rotatable part has been turned through an angle $\alpha$; in the second normal position the attachment is turned through 180°.

DESCRIPTION OF PREFERRED EMBODIMENT

In the first example of the present invention, 1 designates a telephone handset with an earpiece 2 and mouthpiece 3. An elongated carrier 4 of dish form, preferably consisting of toughly elastic synthetic plastics material, is easily removably clamped on to the handle part 1' of the telephone handset 1, e.g. by resiliently snapping the carrier 4 onto the handset as shown in FIG. 2, or by providing the opposite sides of the carrier with a pair of flanges which are fastened together with a screw as shown in FIG. 5, or by holding such a pair of flanges together with a spring clip as shown in FIG. 6. In each of these embodiments, the carrier 4 is adapted to be flush in shape with the handle part 1' and to conform with its color tone.

A shoulder rest 6 is shaped and dimensioned to fit into a longitudinal recess 5 on the reinforced back part 4' of the carrier 4 (FIG. 3), which rest can be hinged out about a pivot bolt 6' into the position for use transverse to the handle part 1', permitting supporting of the handset on the shoulder of the telephone user. When the handset/is not in use the shoulder rest 6 can be sunk into the recess 5. The shoulder rest 6 has a shape which conforms exactly to the recess 5 and when in the hinged-in position (FIG. 3) it is expediently flush in shape with the outer surface of the carrier 4 of dish form. When in its position for use, the shoulder rest 6 extends outwardly from the handle part 1' at an angle of 100° to 110° thereto, and is self-locking in its hinged-out position (FIG. 1) for example by clamp action. Likewise the shoulder rest 6 is also self-locking in the countersunk position when not in use and can be pushed out of the countersunk position by a slider 7, and then can be grasped better by hand.

The shoulder rest 6 is U-shaped in cross-section (see FIG. 4) and the U-space is filled with an adhesion element 9, such as soft or spongy rubber, which protrudes slightly on the contact side. Thanks to the adhesion element 9, slipping of the shoulder rest 6 in the utilization position is counteracted.

A two-part attachment 8 (see FIG. 3) is easily removably arranged on the earpiece 2, and the part 8' is pushed in frictionally engaging manner onto the earpiece 2. The part 8" is rotatably arranged on the part 8'. The plane E of the earpiece part 8" is angularly inclined to the plane E' of the earpiece part 8' by an angle $\alpha$ of about 30°. The earpiece part 8" can be adapted better to the outer ear by rotation to the left or right through 90°.

According to whether the handset is rested on the left or right shoulder of the telephone user, the earpiece part 8" can be turned through 90° to the left or right and thus adapted to the left or right ear. When the two attachments 4 and 8 are not in use they can be removed from the handset or left on it, in which latter case the handset 1 permits unhindered normal use merely by hingeing in of the rest 6. For the purpose of holding the handset without hands then it is merely necessary for the shoulder rest 6 to be hinged out again. When the rest 6 is hinged out (FIG. 1) the handset can be supported on the left or right shoulder of the telephone user and then well-fitting abutment of the handset on the ear can be achieved by rotation of the ear-piece part 8". The removal of the two attachments 4 and 8 is readily possible.

In the second example of the present invention (FIGS. 7 and 8) the telephone handset 1 with earpiece 2 and mouthpiece 3 comprises an earpiece 2 which can be adjusted by rotation to the left or right about the axis x. On its reinforced back part the handle part 1' again possesses an elongated recess 5 in which the shoulder rest 6 is arranged for pivoting out about the pivot bolt 6'. The shoulder rest 6 is again let into the recess 5 so as to fit exactly and to be flush, with matching shape, with the handle part 1'. According to whether the handset 1 or the rest 6 is to be supported on the left or right shoulder of the telephone user, the earpiece 2 can be pivoted to the left or right out of the normal position O (FIG. 8)

as far as an angle α. This pivoting of the earpiece renders possible its good adaptation to the left or right ear.

According to the third form of the telephone handset 1, shown in FIGS. 9 and 10, as in FIG. 3 a two-part attachment 8 is pushed in frictionally engaging manner on to the earpiece 2. The earpiece part 8", which is rotatable to the left or right through an angle α, is again rotatably arranged on the part 8' of the attachment 8. This rotatability of the earpiece part 8" permits its adaptation to the left or right ear when the handset is supported on the left or right shoulder of the telephone user. Markings in the form of lines, dots or letters, by means of which the setting of the earpiece part 8" is facilitated, can be provided on the rotatable parts 8', 8".

I claim:

1. A telephone handset comprising a handle element, a shoulder rest mounted on said handle element for outwardly pivotable movement relative to said handle element to permit said handset to be supported on either shoulder of a user, said shoulder rest being so shaped that, when it is pivoted into engagement with said handle element, the outer surface of said shoulder rest matches the shape of and is flush with the outer surface of said handle element, and a rotatably adjustable earpiece on said handset, said earpiece having an angularly displaceable ear-contact surface which is adapted to be positioned to properly engage either the right ear or the left ear of the telephone user by rotatable adjustment of said earpiece relative to said handle element.

2. The telephone handset of claim 1 wherein said handle element includes a carrier member removably clamped to said handset, said carrier member including a thickened portion which includes an elongated recess therein for the reception of said shoulder rest, said shoulder rest being pivotably attached to said carrier member for pivotable movement into and out of said recess.

* * * * *